H. B. CARMICHAEL.
ATTACHMENT FOR MOTOR VEHICLES.
APPLICATION FILED JUNE 8, 1915.
1,219,247.
Patented Mar. 13, 1917.
2 SHEETS—SHEET 1.
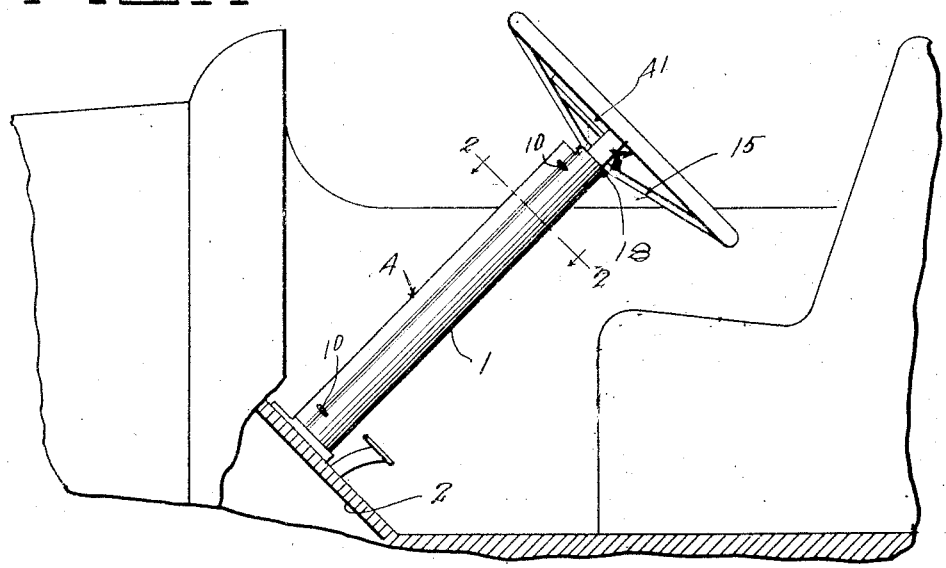
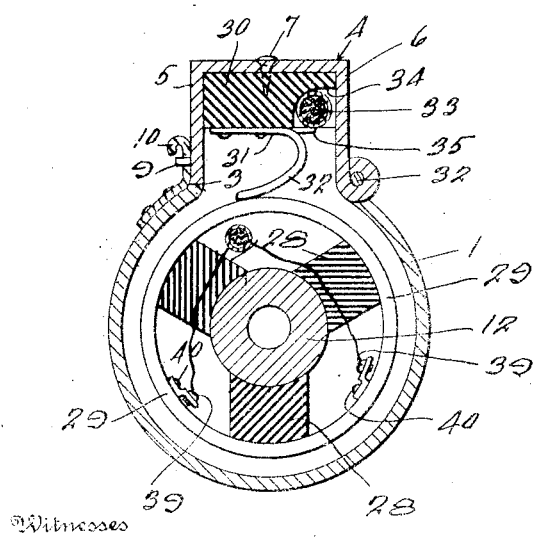
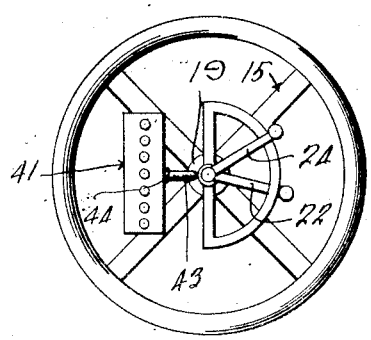
Inventor
H. B. Carmichael H. B. CARMICHAEL.
ATTACHMENT FOR MOTOR VEHICLES.
APPLICATION FILED JUNE 8, 1915.
1,219,247.
Patented Mar. 13, 1917.
2 SHEETS—SHEET 2.
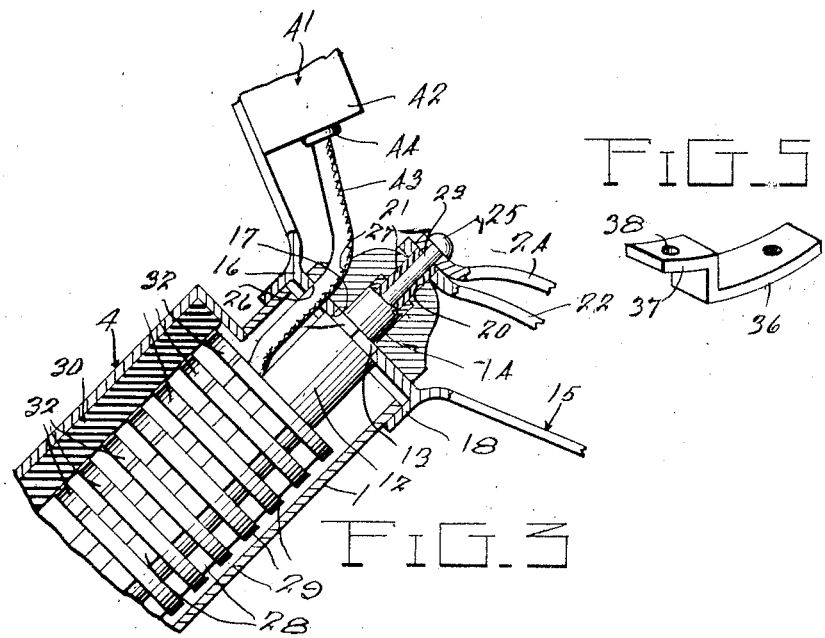
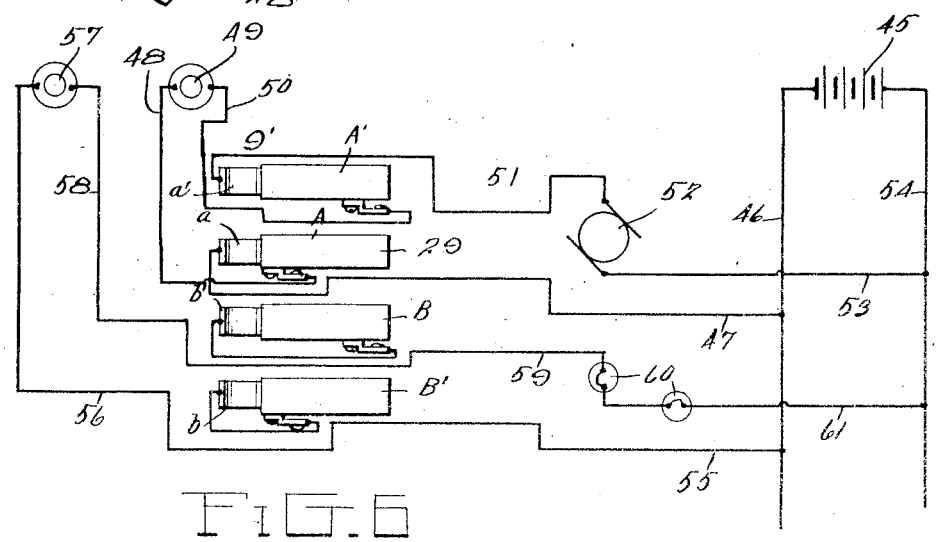
Inventor
H. B. Carmichael

UNITED STATES PATENT OFFICE.

HARVEY B. CARMICHAEL, OF KEGOMIC, PETOSKEY, MICHIGAN.

ATTACHMENT FOR MOTOR-VEHICLES.

1,219,247.

Specification of Letters Patent.     Patented Mar. 13, 1917.

Application filed June 8, 1915.   Serial No. 32,932.

*To all whom it may concern:*

Be it known that I, HARVEY BIRD CARMICHAEL, a citizen of the United States, residing at Kegomic, Petoskey, in the county of Emmet and State of Michigan, have invented certain new and useful Improvements in Attachments for Motor-Vehicles; and I do hereby declare the following to be a full, clear, and exact description of the invention, such as will enable others skilled in the art to which it appertains to make and use the same.

This invention relates to new and useful improvements in attachments for motor vehicles and the principal object of the invention is to provide a device which is designed to allow the use of a switch box on the steering wheel and permit the said steering wheel to turn in the usual way.

Another object of the invention is to provide a device which is so arranged as to control the various starting, lighting, gear shifting and other devices from the steering column alone.

Another object of the invention is to provide a switch box which may be readily mounted on the steering wheel and which is so connected to a number of contact rings carried by the steering post as to allow the rings to bear against or revolve against brushes and carry current from the switch box to the various devices to be operated.

With these and other objects in view the invention consists in the novel combination and arrangement of parts which will be fully set forth in the following specification and accompanying drawings, in which:—

Figure 1 is a fragmentary view illustrating this improved device applied to the steering column of a motor vehicle.

Fig. 2 is a sectional view on line 2—2 of Fig. 1.

Fig. 3 is a vertical sectional view through the steering column illustrating the details of construction of the various parts, and Fig. 4 is a top plan view of the steering wheel showing the arrangement of the switch box with relation to the engine control.

Fig. 5 is a perspective view of one of the clips by which the wire is secured to the rings, and Fig. 6 is a wiring diagram illustrating the several connections.

Referring now to the drawings by characters of reference, the numeral 1 designates the steering column or casing which extends upwardly from the foot board 2 of the vehicle. This steering column like those of the ordinary form is preferably cylindrical and is provided with a longitudinal opening 3 which is covered by the trough shaped cover designated generally by the numeral 4. This trough shaped cover comprises the side walls 5 and 6 which are connected by the end walls 7 and the side wall 6 is hingedly secured as at 8 to the casing or column 1. The wall 5 is provided with a suitable lug 9 which extends through an opening formed in the free end of the spring 10 which spring is secured as at 11 to the column 1 adjacent the opening 3. It will thus be seen that when the cover 4 is closed the pin 9 will extend through the opening and thus form a latch to prevent the cover from being accidentally removed. The usual hollow steering post 12 is mounted to rotate within the housing or steering column 1 and the lower end of the steering post is connected to the steering mechanism while the upper end is connected to the steering wheel in a manner which will be more fully hereinafter described.

The upper end of the steering post is provided with the reduced rectangular extension 13 having the reduced screw threaded portion 14 formed thereon. The steering wheel designated generally 15 comprises the usual hub 16 provided with a rectangular opening 17 to receive the rectangular extension 13 of the steering post. A suitable collar 18 extends downwardly from the under side of the hub 16 and overlies the upper edge of the steering column 1 as clearly shown in Fig. 3. In order to secure the steering wheel on the end of the steering post, there is provided the nut 19 which is formed with an internally screw threaded bore and is provided with the reduced smooth bore 20 through which the hollow shaft 21 extends. This hollow shaft is provided at its upper end with a squared portion for the connection with the lever 22 and the lower end of the hollow shaft is connected in any suitable manner to either the spark or the gasolene control of the motor. Extending through the hollow shaft is the shaft 23 having the lever 24 connected to its upper end and the opposite end of this shaft may be connected to the means for controlling the spark or gasolene of the vehicle.

In order to hold the levers and cranks on their respective shafts, there is provided the nut 25, which is threaded on the reduced extension on the end of the shaft 23. Formed in the nut 19 and in the hub 16 are the alining apertures 26 and 27 respectively, which openings form a passage through which the cable carrying the conductor wires passes.

Secured to the exterior of the steering post 12 and extending radially therefrom at spaced intervals are the longitudinally extending insulating strips 28. Carried on the outer edges of these strips are the contact rings 29 which are arranged in pairs and are preferably approximately one-eighth of an inch thick, and one quarter of an inch wide. These contact rings are connected to the wires within the cable hereinbefore mentioned and these wires in turn are connected to their respective push buttons in the switch box which will be more fully hereinafter described. It will thus be seen that regardless of the position of the steering wheel contact may be had through these contact rings, with an outer source as will be more fully hereinafter described. Secured by suitable screws or in any other preferred manner to the wall 7 of the cover 4 is a strip of insulating material 30, having secured to its inner face at spaced intervals the brushes 31 which are provided with the spring tongues 32 which bear against the contact rings 29. These brushes, like the rings are arranged in pairs and are attached to suitable wires carried within the cable 33 which is located in the recess 34 formed in the outer face of the insulator 30. Suitable clips 35 are secured to the insulator and overlie the cable 33 to hold the same in place when the cover 4 is swung on its hinge 8.

In order to provide a means whereby the wires may be attached to the rings 29, there are provided the clips best illustrated in Fig. 5 which comprise the body 36 provided with the offset portions 37. These offset portions are provided with the openings 38 for the reception of the set screws 39 and the body 36 is also formed with openings for the reception of the screws 40 by which they are attached to the rings. These clips are attached to alternate rings in staggered relation as illustrated in Figs. 2 and 6 and the wires are secured by means of the screws 39 so as to form electrical contact.

The switch box hereinbefore referred to is designated generally by the numeral 41 and comprises a suitable casing 42 having the switches mounted therein. This switch box is provided with a suitable means by which it is mounted on the steering wheel and the cable 43 carrying the conductors enters the box at 44 through a suitable insulator.

As previously described, the rings and brushes are arranged in pairs and upon referring to the diagram it will be clearly seen that when the device is in use the current flows from the power source 45 to the line wire 46 into the branch wire 47 and thence to one of the brushes of the set designated respectively $a$ and $a'$. The current then passes through the ring A into the wire 48 and thence through the switch 49 into the wire 50 from whence it passes into the ring A' and thence into the contact brush from whence it passes back through the wire 51 to the starting motor. The current then passes from the opposite terminal of the starting motor through the wire 53 to the return wire 54 of the power source. When the side lights of the vehicle are to be lighted the current passes from the power source 45 into the wire 46 and thence into the branch wire 55 from whence it passes into one of the contact brushes in the second set which brushes are designated respectively by the characters $b$ and $b'$. The current then passes through the ring B into the wire 56, thence through the switch 57 into the wire 58, from whence it passes through the ring B into the contact brush $b'$ and thence into the wire 59 to the lights 60. The current then passes from the lights 60 into the wire 61 and back to the power source 45 through the wire 54. It will thus be seen that any number of sets of rings A and B may be provided to operate the various attachments of motor vehicles and may be to operate these devices without necessitating the user removing his hands from the steering wheel.

From the foregoing it is apparent that a particularly simple and efficient means for transmitting the current from the switch box to the various appliances is provided which will operate regardless of the position of the steering wheel and it will thus be seen that the vehicle is under control at all times and the necessity of the driver removing his hands from the steering wheel is eliminated.

While in the foregoing there has been shown and described the preferred embodiment of this invention, it is to be understood that such changes may be made in the combination and arrangement of parts as will fall within the spirit and scope of the appended claims.

What is claimed is:—

1. In a device of the class described, a steering column having a longitudinal slot extending down one side, a cover hinged to said column adjacent the slot for closing the same, said cover being adapted to allow access to the interior of the column, clips for holding the cover closed, a plurality of brushes carried by the cover and a plurality of rings on the steering shaft within the column adapted to coöperate with the brushes in order to establish electrical communication between the stationary and rotary elements.

2. A device of the class described comprising a steering column having a slot extending down one side, a steering rod rotatably mounted within the column, a steering wheel at the outer end of the steering rod, a switch box mounted on the steering wheel, a cover hinged to the steering column adjacent one side edge of the slot and adapted to swing over and close said slot, an insulating block within the cover, contact brushes mounted on said block, a plurality of contact rings mounted on the steering shaft and insulated from each other, strips of insulation holding said rings in place, said strips being spaced from each other to form longitudinal passages, a cable extending from the switch box through one of the passages, a plurality of strands of wire within the cable connected to the rings, the insulating block being provided with a longitudinal groove therein, and a cable seated in said groove and consisting of a plurality of strands for connection to their respective brushes, whereby electrical communication is established between the switch box and the last-named cable.

In testimony whereof I affix my signature in presence of two witnesses.

HARVEY B. CARMICHAEL.

Witnesses:
 Geo. S. Rice,
 C. Knight.